US008899481B2

(12) United States Patent
Wright et al.

(10) Patent No.: US 8,899,481 B2
(45) Date of Patent: Dec. 2, 2014

(54) APPARATUS FOR AND METHOD OF AUTOMATICALLY INTEGRATING AN AUXILIARY READER IN A POINT-OF-TRANSACTION SYSTEM HAVING A WORKSTATION READER

(71) Applicant: Symbol Technologies, Inc., Schaumburg, IL (US)

(72) Inventors: Mariya Wright, Cortlandt Manor, NY (US); Nina Feinstein, Hicksville, NY (US); Christopher J. Fjellstad, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/786,958

(22) Filed: Mar. 6, 2013

(65) Prior Publication Data
US 2014/0252094 A1    Sep. 11, 2014

(51) Int. Cl.
*G06K 7/00* (2006.01)
*G06K 7/10* (2006.01)

(52) U.S. Cl.
CPC .................................... *G06K 7/1096* (2013.01)
USPC .......................................... 235/440; 235/454

(58) Field of Classification Search
USPC .................. 235/440, 454, 462.01–462.45
See application file for complete search history.

(56) References Cited

U.S. PATENT DOCUMENTS

| 6,783,071 | B2 | 8/2004 | Levine |
| 7,841,524 | B2 | 11/2010 | Schmidt |
| 7,913,911 | B2 | 3/2011 | van Ellen |
| 7,969,282 | B2 | 6/2011 | Powell |
| 8,174,386 | B2 | 5/2012 | Oh |
| 8,260,948 | B2 | 9/2012 | Chand |
| 2007/0290043 | A1* | 12/2007 | Russell et al. ........... 235/462.14 |
| 2009/0001171 | A1 | 1/2009 | Carlson et al. |
| 2009/0210569 | A1 | 8/2009 | Lusetti |
| 2009/0307097 | A1* | 12/2009 | De Faria ........................ 705/17 |
| 2011/0019919 | A1 | 8/2011 | Buckner |
| 2011/0199191 | A1 | 8/2011 | Buckner |
| 2012/0145791 | A1 | 6/2012 | Gregerson |

OTHER PUBLICATIONS

Universal Serial Bus OEM Point-of-Sale Device Interface Specification, Version Code 2.4, dated Sep. 18, 2012.
Device Class Definition for Human Interface Devices (HID), Version 1.11, dated Jun. 27, 2001.
International Search Report and Written Opinion dated Jun. 23, 2014 in counterpart application PCT/US2014/018585.

* cited by examiner

*Primary Examiner* — Edwyn Labaze
(74) *Attorney, Agent, or Firm* — Nong-Qiang Fan

(57) ABSTRACT

A checkout system for electro-optically reading targets includes a host, a workstation reader, and an auxiliary reader operatively connected to the workstation reader. The workstation reader captures data associated with the targets, and communicates its captured data with the host over a predetermined communications protocol. The auxiliary reader also captures data associated with the targets independently of the workstation reader. The workstation reader automatically integrates the auxiliary reader in the system by automatically detecting the protocol of the auxiliary reader, and by automatically configuring the detected protocol of the auxiliary reader to conform to the predetermined communications protocol of the workstation reader, thereby enabling the auxiliary reader to communicate its captured data with the host.

14 Claims, 3 Drawing Sheets

APPARATUS FOR AND METHOD OF AUTOMATICALLY INTEGRATING AN AUXILIARY READER IN A POINT-OF-TRANSACTION SYSTEM HAVING A WORKSTATION READER

FIELD OF THE DISCLOSURE

The present disclosure relates generally to a point-of-transaction system for electro-optically reading targets with a workstation reader that communicates with a host over a predetermined communications protocol, and with an auxiliary reader having a communications protocol, and, more particularly, to an apparatus for, and a method of, automatically integrating the auxiliary reader in the system by automatically detecting the protocol of the auxiliary reader, and by automatically configuring the detected protocol to conform to the predetermined communications protocol, thereby enabling the auxiliary reader to communicate with the host.

BACKGROUND

In the retail industry, horizontal or flat bed slot scanners, each having a single horizontal window; vertical slot scanners, each having a single upright or vertical window; and bi-optical scanners, each having both a horizontal window and an upright window, have been used as workstation readers to electro-optically read targets, such as one-dimensional bar code symbols, particularly of the Universal Product Code (UPC) type, and two-dimensional bar code symbols, such as PDF417 and QR codes, at point-of-transaction checkout systems operated by checkout clerks and/or by customers in supermarkets, warehouse clubs, department stores, and other kinds of retailers and businesses, for many years. Products to be purchased bear identifying symbol targets and are typically slid by a user across a respective workstation window, e.g., from right to left, or from left to right, in a "swipe" mode. Alternatively, the user merely presents the symbol target on the product to, and holds the product momentarily steady at, a central region of a respective workstation window in a "presentation" mode. The choice depends on the type of target, on user preference, and on the layout of the system.

Some workstation readers are laser-based, and project a multitude of laser scan lines through a respective workstation window. When at least one of the scan lines sweeps over a symbol target associated with a product, the symbol target is processed, decoded and read. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the respective workstation window as a scan pattern of the laser scan lines.

Other workstation readers are imager-based, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a respective workstation window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into data related to the target being read, e.g., decoded data indicative of a symbol, or into a picture of a target other than a symbol.

As advantageous as the known laser- and/or imager-based workstation readers have been in capturing data from such targets, the systems often include portable, auxiliary electro-optical scanners or readers, either laser-based or imager-based, and either operated by the clerk and/or by the customer. A typical auxiliary reader is either held in a user's hand and operated in a handheld mode to facilitate reading of large, heavy or bulky products that cannot be readily lifted into position facing at least one of the windows of a workstation reader, or is supported on a cradle, convenience stand, or analogous support in a hands-free mode in which the products are brought to, and positioned in front of, a window on the auxiliary reader. In some applications, the auxiliary reader can be directly placed and supported on a support surface, such as a countertop, in which case, no separate cradle or convenience stand need be employed to support the auxiliary reader. In general, the auxiliary reader, or its support, has a cord or cable that is plugged directly into a port, e.g., a Universal Serial Bus (USB) port, on the workstation reader. When the support is plugged into the workstation reader, the connection between the auxiliary reader and the support is typically wireless.

The auxiliary reader is especially useful when operated by the customer, independently of the assistance of the clerk. Thus, the customer can read targets provided on loyalty cards, identification cards, coupons, smartphones, and even countertop merchandise bought on impulse. For such reasons, among others, such as privacy, hygiene, and security, many customers do not wish to hand over identification cards, such as drivers' licenses containing age data, to the clerk, and would instead prefer to operate the auxiliary reader. Due to the increasing popularity of coupons being delivered over smartphones, and thus the increased likelihood that the customer's smartphone will be handled during checkout, many retailers also prefer that the customer operate the auxiliary reader out of concern for legal liability in the event that the clerk accidentally drops the customer's smartphone.

A typical known checkout system further includes a host computer that communicates not only with a payment register, but also with the workstation reader over a predetermined communications protocol. In this disclosure, the predetermined communications protocol is a well-defined system of digital message formats and rules for exchanging messages in or between the workstation reader and the host computer. The protocol may include signaling, authentication, and error detection and correction capabilities. The protocol essentially defines the syntax, semantics, and synchronization of the digital communication, and is typically implemented in software, but could be implemented in firmware or hardware. When a communications protocol is agreed upon by all parties involved, it may be developed into a technical standard. There are many such standards. By way of non-limiting example, one such standard is the Universal Serial Bus OEM Point-Of-Sale Device Interface Specification, Version Code 2.4, Sep. 18, 2012 (hereinafter the "IBM" standard); and another such standard is the Device Class Definition for Human Interface Devices (HID), Version 1.11, Jun. 27, 2001 (hereinafter the "HID" standard).

The above-described auxiliary reader must also communicate with the host computer over a communications protocol, and preferably the same protocol that the workstation reader utilizes. One concern, however, is that the auxiliary reader, which a retailer wishes to use, may not have this same protocol. The retailer may have available, and wish to use, auxiliary readers that employ different protocols. For example, such different protocols may be employed by different auxiliary reader manufacturers, or even by the same auxiliary reader manufacturer who has changed protocols, or who has different models with different protocols. An auxiliary reader with a mismatched protocol will not work in the checkout system.

Accordingly, there is a need to readily integrate the auxiliary reader in the checkout system and to enable the auxiliary reader to readily communicate with the host computer.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
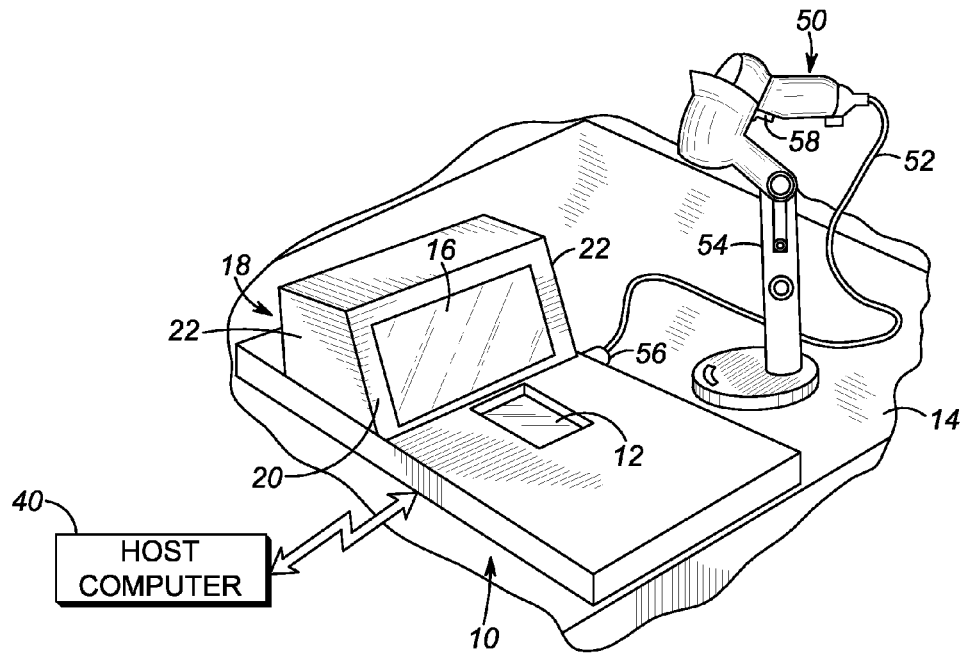
FIG. 1 is a perspective view of a representative embodiment of a checkout system for electro-optically reading targets with a workstation reader and with an auxiliary reader in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a point-of-transaction system for electro-optically reading targets, preferably symbol targets and/or non-symbol targets typically associated with identifying products or related items to be processed in a transaction, or checked out of a retailer. The system includes a host, a workstation reader, and an auxiliary reader operatively connected to the workstation reader. The workstation reader has a workstation window, a workstation data capture assembly operative for capturing data associated with the targets, e.g., by image capture, through the workstation window, and a workstation microprocessor operative for controlling the workstation assembly and for communicating the data captured by the workstation assembly with the host over a predetermined communications protocol, e.g. the IBM protocol or the HID protocol identified above. The auxiliary reader also has an auxiliary window, an auxiliary data capture assembly operative for capturing data associated with the targets through the auxiliary window, e.g., by image capture, independently of the workstation reader, and an auxiliary microprocessor operative for controlling the auxiliary assembly and having a communications protocol, e.g., the IBM protocol or the HID protocol identified above.

The workstation microprocessor is also operative for automatically integrating the auxiliary reader in the system by automatically detecting the protocol of the auxiliary reader, and by automatically configuring the detected protocol of the auxiliary reader to conform to the predetermined communications protocol of the workstation reader, thereby enabling the auxiliary reader to communicate the data captured by the auxiliary assembly with the host. The automatic integration of the auxiliary reader in the system relieves the above-described concern in the prior art of mismatched protocols. The workstation microprocessor automatically detects the protocol of the auxiliary reader when the auxiliary reader is initially operatively connected to the workstation reader. The workstation microprocessor automatically detects the protocol of the auxiliary reader by sending a protocol query signal to the auxiliary microprocessor, and by receiving a protocol identification response signal from the auxiliary microprocessor. The workstation microprocessor automatically configures the detected protocol of the auxiliary reader by changing, or translating, the detected protocol to the predetermined communications protocol.

A method, in accordance with another aspect of this disclosure, is performed by capturing data associated with the targets through a workstation window of a workstation reader, communicating the data captured by the workstation reader with a host over a predetermined communications protocol, capturing data associated with the targets through an auxiliary window of an auxiliary reader independently of the workstation reader, automatically detecting a communications protocol of the auxiliary reader, and automatically configuring the detected protocol of the auxiliary reader to conform to the predetermined communications protocol of the workstation reader, thereby enabling the auxiliary reader to communicate the data captured by the auxiliary reader with the host.

Turning now to the drawings, FIG. 1 depicts a dual window, bi-optical, point-of-transaction workstation reader 10 for use by retailers at a checkout stand to process transactions involving the purchase of products bearing identifying indicia or targets, such as the UPC symbols described above. The targets can be printed on the products or their packaging, or can be displayed on coupons or screens of cellular telephones. Bi-optical workstation reader 10 has a generally horizontal window 12 elevated, or set flush with, a generally horizontal support surface, such as a countertop 14 of the checkout stand, and a vertical or generally vertical, i.e., slightly rearwardly or forwardly tilted (referred to as "upright" hereinafter) window 16 set flush with, or recessed into, a generally upright or raised housing portion 18 above the countertop 14. Bi-optical workstation reader 10 either rests directly on the countertop 14 as illustrated, or rests in a well formed in the countertop 14. Raised housing portion 18 has a front wall 20 peripherally surrounding the upright window 16, and a pair of side walls 22, 22 at opposite lateral sides of the bi-optical workstation reader 10.

The illustrated bi-optical workstation reader 10 is merely representative and is but one example of a workstation reader that can be used in accordance with this disclosure. A workstation reader having a single window can also be used. For example, a horizontal or flat bed slot scanner having a single horizontal window, or a vertical slot scanner having a single upright or vertical window, could also be employed. Workstation readers having different housing configurations are also contemplated by this disclosure.

Figure 2:
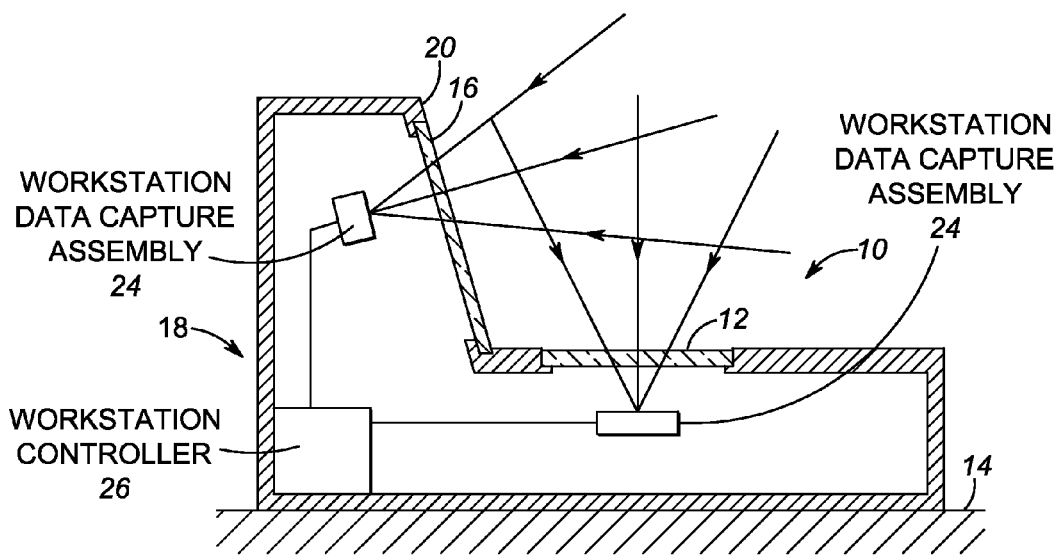
FIG. 2 is a part-schematic, part-diagrammatic view of various components of the workstation reader of FIG. 1.

As schematically shown in FIG. 2, the workstation reader 10 advantageously includes at least one data capture assembly 24, and preferably, a plurality of data capture assemblies 24, 24, one for each window 12, 16, for electro-optically reading a target by capturing light passing through either or both windows 12, 16 over intersecting fields of view from a target facing at least one of the windows. Each data capture assembly 24 can be laser- and/or imager-based, as described above. Details of a representative imager-based data capture assembly are described below in connection with FIG. 3. The data capture assemblies 24, 24 are operatively connected to a programmed microprocessor or workstation controller 26 operative for controlling their operation. The workstation controller 26 is also used for decoding the return light scattered from the target, for processing the captured data, and for communicating the captured data with a remote host computer 40 (see FIG. 1) over a predetermined communications protocol, e.g. the IBM protocol or the HID protocol identified above. The host computer 40 is typically also in communication with a payment register.

In typical use, a clerk or a customer processes a product bearing a UPC symbol target thereon past the windows 12, 16 by swiping the product across a respective window 12, 16, or by presenting the product by holding it momentarily steady at the respective window 12, 16. The symbol target may be located on any of the top, bottom, right, left, front and rear, sides of the product, and at least one, if not more, of the data capture assemblies 24, 24 will capture the return light reflected, scattered, or otherwise returning from the symbol target through one or both windows 12, 16.

As also shown in FIG. 1, the workstation reader 10 is accompanied by an electro-optical auxiliary reader 50 having either a laser-based or an imager-based, auxiliary data capture assembly to facilitate reading of large, heavy or bulky products that cannot be readily lifted into position facing at least one of the windows 12, 16. Details of a representative imager-based, auxiliary data capture assembly are described below in connection with FIG. 3. Analogous to that described above for the workstation reader 10, the auxiliary data capture assembly is operatively connected to a programmed microprocessor or auxiliary controller operative for controlling its operation. The auxiliary controller can be used for decoding the return light scattered from the target, for processing the captured data, and for communicating the captured data with the remote host computer 40 using a communications protocol, e.g. the IBM protocol or the HID protocol identified above.

The auxiliary reader 50 is advantageously ergonomically configured as a gun-shaped, portable housing having an upper barrel or body and a lower handle tilted rearwardly away from the body at an angle of inclination, for example, fifteen degrees. An auxiliary window is located adjacent the front or nose of the auxiliary reader 50. In typical use, the auxiliary reader 50 is held in a user's hand and used in a handheld mode in which a trigger 58 is manually depressed to initiate electro-optical reading of the targets to be read in a range of working distances relative to the auxiliary window. The auxiliary reader 50 can also be used in a hands-free mode by being placed and supported in a support, such as a convenience stand 54, mounted on the countertop 14. In the hands-free mode, the target is positioned to face the auxiliary window of the supported auxiliary reader 50, and the auxiliary reader 50 can be free-running, i.e., actuation of the trigger 58 is not necessary to initiate reading. The auxiliary reader 50 can also be placed directly on the countertop 14; in such cases, the stand 54 is not used.

As illustrated, the auxiliary reader 50 has a cord or cable 52 that is plugged directly into an auxiliary reader port 56, e.g., a USB port, on the workstation reader 10. In a variant construction, the cable 52 is connected between the stand 54 and the workstation reader 10. The illustrated auxiliary reader 50 and its support 54 are merely representative and constitute but one embodiment of an auxiliary reader and its support that can be used in accordance with this disclosure. Other configurations can also be employed for both the auxiliary reader 50 and its support 54.

Figure 3:
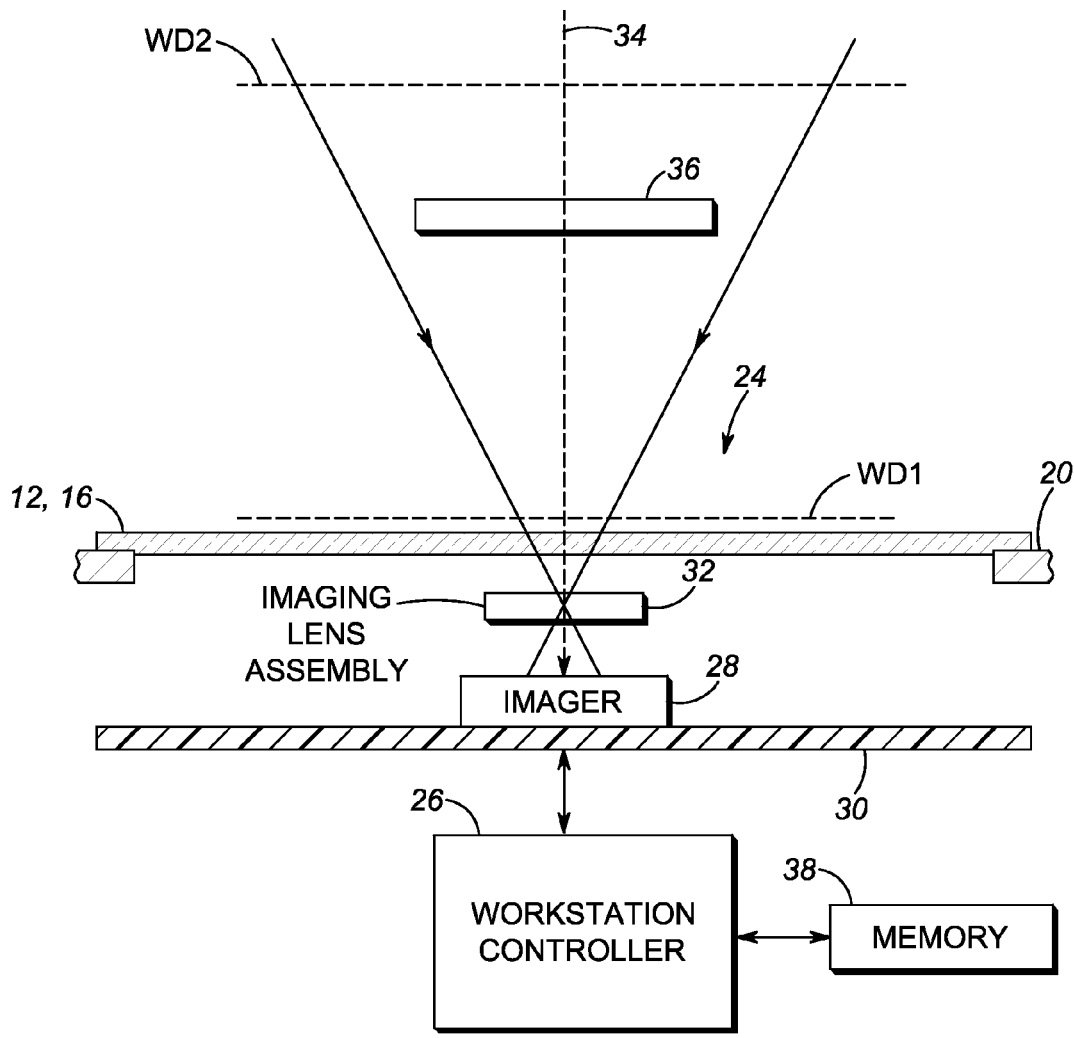
FIG. 3 is a schematic diagram of a data capture assembly for use in the workstation reader and/or the auxiliary reader of FIG. 1.

As schematically shown in FIG. 3, each workstation data capture assembly 24 includes an imager 28 mounted on a printed circuit board (PCB) 30. The imager 28 is a solid-state device, for example, a CCD or a CMOS imager having a one- or two-dimensional array of addressable image sensors or pixels arranged in mutually orthogonal rows and columns, and operative for detecting return light captured by an imaging lens assembly 32 along an imaging axis 34 through either workstation window 12, 16. The return light is scattered and/or reflected from a target 36 over the field of view. The field of view is generally perpendicular to the imaging axis 34.

The imaging lens assembly 32 is part of the imaging system and is operative for focusing the return light onto the array of image sensors to enable the target 36 to be read. The target 36 may be located anywhere in a working range of distances between a close-in working distance (WD1) and a far-out working distance (WD2). In a preferred embodiment, WD1 is about one-half inch from either window 12, 16, and WD2 is about thirty inches from either window 12, 16.

As shown in FIG. 3, the imager 28 is operatively connected to the workstation controller or microprocessor 26 operative for controlling the operation of the imager 28. A memory 38 is connected and accessible to the workstation controller 26. Preferably, the workstation controller 26 is the same as the one used for processing the return light from the target 36. In operation, the workstation controller 26 sends a command signal to energize and expose the imager 28 to collect return light from the target 36 only during a short exposure time period, say 500 microseconds or less. A typical array needs about 11-33 milliseconds to acquire the entire target image and operates at a frame rate of about 30-90 frames per second.

As previously noted, the aforementioned auxiliary data capture assembly in the auxiliary reader 50 has the same structure and function as described for the workstation data capture assembly 24 and, hence, will not be repeated for the sake of brevity. Thus, FIG. 3 also illustrates those same components of the auxiliary data capture assembly in the auxiliary reader 50.

In accordance with this disclosure, the workstation microprocessor 26 is also operative for automatically integrating the auxiliary reader 50 in the system by automatically detecting the protocol of the auxiliary reader 50, and by automatically configuring the detected protocol of the auxiliary reader 50 to conform to the predetermined communications protocol of the workstation reader 10, thereby enabling the auxiliary reader 50 to communicate the data captured by the auxiliary assembly with the host computer 40. The automatic integration of the auxiliary reader 50 in the system relieves the above-described concern in the prior art of mismatched protocols.

The workstation microprocessor 26 automatically detects the protocol of the auxiliary reader 50 when the auxiliary reader 50 is initially operatively connected to the workstation reader 10. For example, this can occur when the cable 52 is first plugged into the port 56. This "plug-in activity" is depicted in the sequence chart of FIG. 4 by the reference numeral 60.

Figure 4:
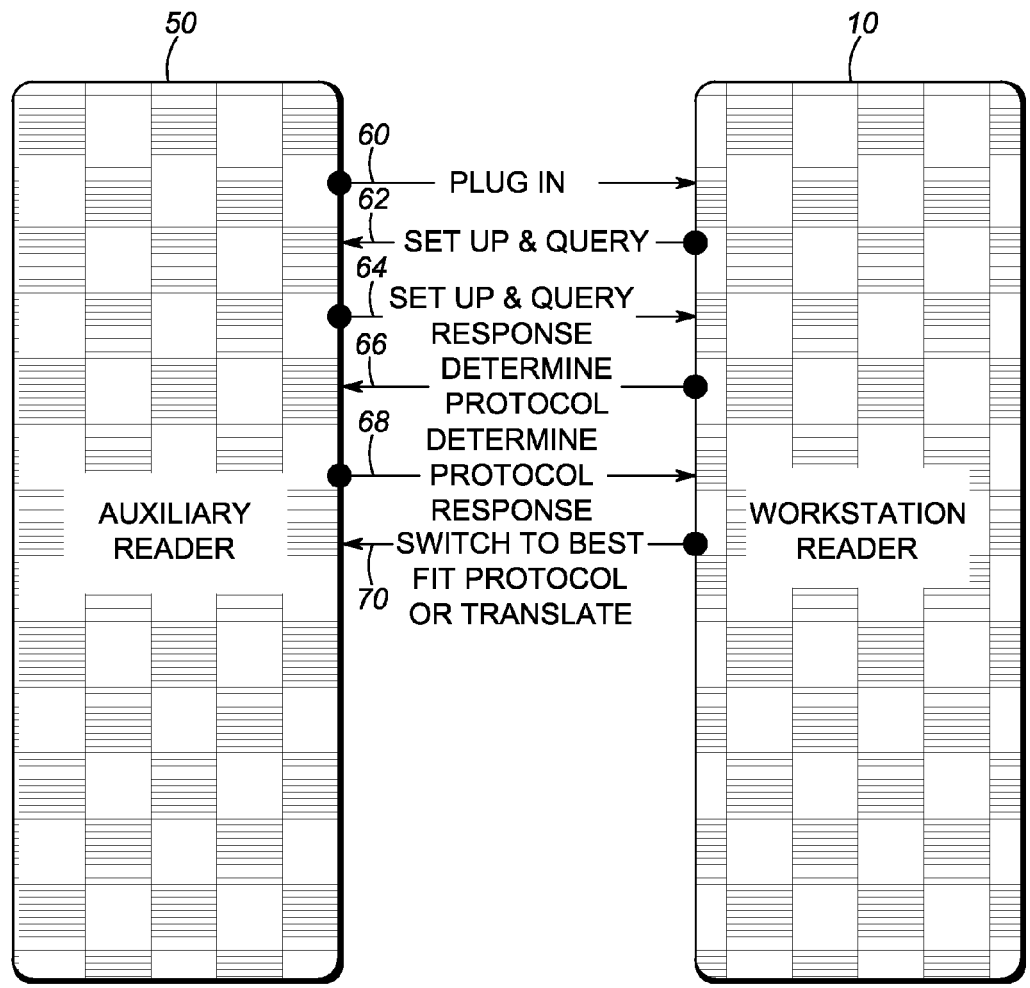
FIG. 4 is a sequence chart depicting steps performed in accordance with the method of this disclosure.

As further shown in the sequence chart of FIG. 4, the workstation microprocessor 26 in the workstation reader 10 automatically sends a setup query message 62 to the auxiliary microprocessor in the auxiliary reader 50 and, in turn, the auxiliary microprocessor automatically sends a setup response message 64 to the workstation microprocessor 26. Next, the workstation microprocessor 26 automatically sends a protocol query message 66 to the auxiliary microprocessor and, in turn, the auxiliary microprocessor automatically sends a protocol response message 68 to the workstation microprocessor 26. Now, the workstation microprocessor 26 knows the protocol of the auxiliary reader 50. If the detected protocol of the auxiliary reader 50 is the same as the predetermined communications protocol of the workstation reader 10, then nothing further need be done because the two protocols match.

However, if there is a mismatch between the two protocols, then the workstation microprocessor 26 automatically configures the detected protocol of the auxiliary reader 50 by changing, or translating, the detected protocol to the predetermined communications protocol, as indicated by the reference numeral 70 in FIG. 4. The auxiliary microprocessor can now communicate with the host computer 40 in a transparent, seamless manner. The workstation reader 10 acts as a proxy between the auxiliary reader 50 and the host computer 40. In a variant construction, if there is a protocol mismatch, then the host computer 40 can upload the predetermined communications protocol to the auxiliary reader 50.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A point-of-transaction system for electro-optically reading targets, comprising:
   a host;
   a workstation reader having a workstation window, a workstation data capture assembly operative for capturing data associated with the targets through the workstation window, and a workstation microprocessor operative for controlling the workstation assembly and for communicating the data captured by the workstation assembly with the host over a predetermined communications protocol; and an auxiliary reader operatively connected to the workstation reader and having an auxiliary window, an auxiliary data capture assembly operative for capturing data associated with the targets through the auxiliary window independently of the workstation reader, and an auxiliary microprocessor operative for controlling the auxiliary assembly and having a communications protocol;

wherein the workstation microprocessor is also operative for automatically integrating the auxiliary reader in the system by automatically detecting the protocol of the auxiliary reader, and by automatically configuring the detected protocol of the auxiliary reader to conform to the predetermined communications protocol of the workstation reader, thereby enabling the auxiliary reader to communicate the data captured by the auxiliary assembly with the host;

wherein the workstation microprocessor automatically detects the protocol of the auxiliary reader when the auxiliary reader is initially operatively connected to the workstation reader; and wherein the workstation microprocessor automatically detects the protocol of the auxiliary reader by sending a protocol query signal to the auxiliary microprocessor, and by receiving a protocol identification response signal from the auxiliary microprocessor.

2. The system of claim 1, wherein the workstation window is located in one of a generally horizontal plane, and a generally upright plane that intersects the generally horizontal plane; and further comprising another workstation window located in the other of the generally planar and upright planes, to configure the workstation reader as a bi-optical workstation reader.

3. The system of claim 1, wherein the workstation assembly includes at least one solid-state workstation imager for capturing through the workstation window an image of the target, and wherein the workstation microprocessor is operative for processing the image.

4. The system of claim 1, wherein the auxiliary assembly includes at least one solid-state auxiliary imager for capturing through the auxiliary window an image of the target, and wherein the auxiliary microprocessor is operative for processing the image.

5. The system of claim 1, wherein the workstation microprocessor automatically configures the detected protocol of the auxiliary reader by changing the detected protocol to the predetermined communications protocol.

6. The system of claim 1, wherein the workstation microprocessor automatically configures the detected protocol of the auxiliary reader by translating the detected protocol to the predetermined communications protocol.

7. A point-of-transaction system for electro-optically reading targets, comprising:
a host;
a bi-optical workstation reader having a first workstation window located in a generally horizontal plane, and a second workstation window located in a generally upright plane that intersects the generally horizontal plane, a workstation data capture assembly including at least one solid-state workstation imager operative for capturing an image of data associated with the targets through at least one of the workstation windows, and a workstation microprocessor operative for controlling the workstation assembly, processing the image, and for communicating the data captured by the workstation assembly with the host over a predetermined communications protocol; and an auxiliary reader operatively connected to the workstation reader and having an auxiliary window, an auxiliary data capture assembly including a solid-state auxiliary imager operative for capturing an image of data associated with the targets through the auxiliary window independently of the workstation reader, and an auxiliary microprocessor operative for controlling the auxiliary assembly and having a communications protocol;

wherein the workstation microprocessor is also operative for automatically integrating the auxiliary reader in the system by automatically detecting the protocol of the auxiliary reader, and by automatically configuring the detected protocol of the auxiliary reader to conform to the predetermined communications protocol of the workstation reader, thereby enabling the auxiliary reader to communicate the data captured by the auxiliary assembly with the host;

wherein the workstation microprocessor automatically detects the protocol of the auxiliary reader when the auxiliary reader is initially operatively connected to the workstation reader; and wherein the workstation microprocessor automatically detects the protocol of the auxiliary reader by sending a protocol query signal to the auxiliary microprocessor, and by receiving a protocol identification response signal from the auxiliary microprocessor.

8. The system of claim 7, wherein the workstation microprocessor automatically configures the detected protocol of the auxiliary reader by changing the detected protocol to the predetermined communications protocol.

9. The system of claim 7, wherein the workstation microprocessor automatically configures the detected protocol of the auxiliary reader by translating the detected protocol to the predetermined communications protocol.

10. A point-of-transaction method of electro-optically reading targets, comprising:
capturing data associated with the targets through a workstation window of a workstation reader;
communicating the data captured by the workstation reader with a host over a predetermined communications protocol;
capturing data associated with the targets through an auxiliary window of an auxiliary reader independently of the workstation reader;
automatically detecting a communications protocol of the auxiliary reader; and
automatically configuring the detected protocol of the auxiliary reader to conform to the predetermined communications protocol of the workstation reader, thereby enabling the auxiliary reader to communicate the data captured by the auxiliary reader with the host;
wherein the automatic detection of the protocol of the auxiliary reader is performed upon operatively connecting the auxiliary reader to the workstation reader; and
wherein the automatic detection of the protocol of the auxiliary reader is performed by sending a protocol query signal from the workstation reader to the auxiliary reader, and by receiving a protocol identification response signal from the auxiliary reader to the workstation reader.

11. The method of claim 10, wherein the capturing of the data by the workstation reader is performed by capturing an image of each target.

12. The method of claim 10, wherein the capturing of the data by the auxiliary reader is performed by capturing an image of each target.

13. The method of claim 10, wherein the automatic configuring of the detected protocol of the auxiliary reader is performed by changing the detected protocol to the predetermined communications protocol.

14. The method of claim 10, wherein the automatic configuring of the detected protocol of the auxiliary reader is performed by translating the detected protocol to the predetermined communications protocol.

* * * * *